(12) United States Patent
Heikkinen

(10) Patent No.: US 6,584,198 B1
(45) Date of Patent: Jun. 24, 2003

(54) DEVICE AND METHOD FOR MONITORING SHOCK

(75) Inventor: Kari-Pekka Heikkinen, Oulu (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/465,102

(22) Filed: Dec. 16, 1999

(51) Int. Cl.⁷ .................................................. H04M 1/00
(52) U.S. Cl. .................. 379/437; 379/433.02; 379/432; 455/575
(58) Field of Search ................... 379/437, 412, 379/428.01, 433.06, 432, 399.01, 433.02, 446; 381/354, 94.1, 177, 396, 412, 94.9; 455/570, 574, 575, 90, 63

(56) References Cited

U.S. PATENT DOCUMENTS 6,480,699 B1 * 11/2002 Lovoi .......................... 455/41

* cited by examiner

*Primary Examiner*—Rexford Barnie
(74) *Attorney, Agent, or Firm*—Perman & Green, LLP

(57) ABSTRACT

A system is devised for utilizing the speaker in a mobile phone or other appliance as a transducer for monitoring the shock to which the appliance is subjected. The shock signal is processed and stored signals relative to said shock and providing means to access said stored data.

8 Claims, 3 Drawing Sheets

DEVICE AND METHOD FOR MONITORING SHOCK

BACKGROUND OF THE INVENTION

Mobile phones are rapidly becoming an article for every day use. To accommodate this fact, manufacturers have reduced the size of such phones to make them easy to carry at all times. This has resulted in the mobile phone being subject to all of the hazards of the user's work and play. Similar to a watch, the mobile phone must now be shock resistant to an ever increasing standard. This increased exposure has strained the warranty services of the manufacturers because the phones are damaged in ways not contemplated on normal warranty conditions. Since there are circumstances beyond which damage is not covered by warranty, an issue arises with respect to the determination of excessive force.

It is a purpose of this invention to provide a simple and inexpensive means of monitoring the shock to which a mobile phone is subjected.

SUMMARY OF THE INVENTION

The dynamic speaker provided as standard equipment on most mobile phones is used as a transducer to sense the shock experienced by the phone. Movement of the speaker core by an external force will produce a signal that is recorded in the memory of the phone. This can be accessed during service to determine if the phone was subjected to excessive force which may negate the warranty. The shock signal from the speaker is filtered and compared to a predetermined threshold. Therefore only the data relating to substantial force are recorded.

DESCRIPTION OF THE DRAWING

The invention is described in more detail below with reference to the attached drawing in which.

DESCRIPTION OF THE PREFERRED EMBODIMENT

Figure 1:
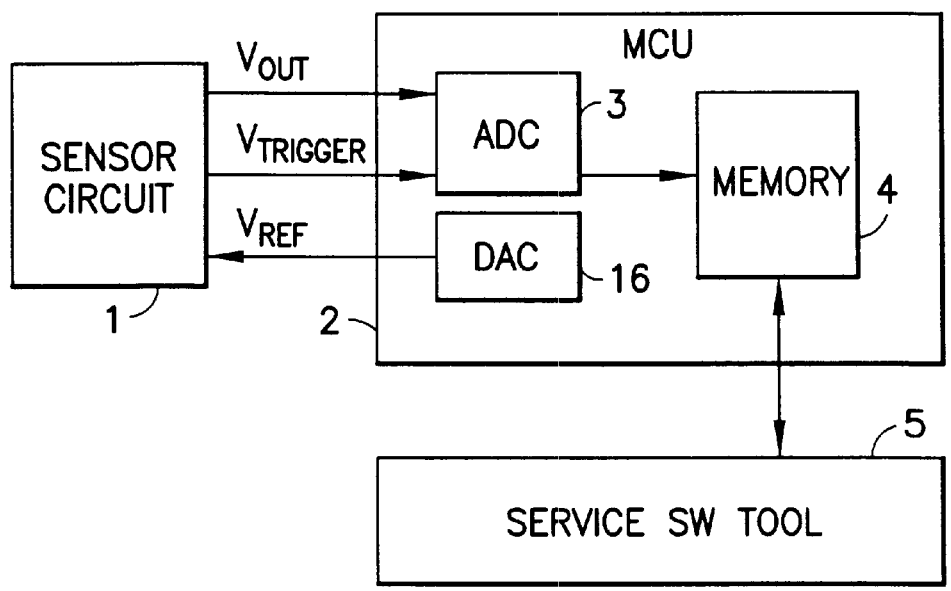
FIG. 1 is a block diagram of the monitoring system of this invention.

The basic system of this invention is shown in FIG. 1. A sensor circuit 1 has its output connected to the microprocessor control unit 2 of a mobile phone. The analog signal from the sensor 1 is converted to a digital signal in the analog to digital converter 3 for storage in a random access memory 4 within the microprocessor control unit 2. Memory 4 maybe accessed by a service processor 5 through the use of service software designed for that purpose.

Figure 2:
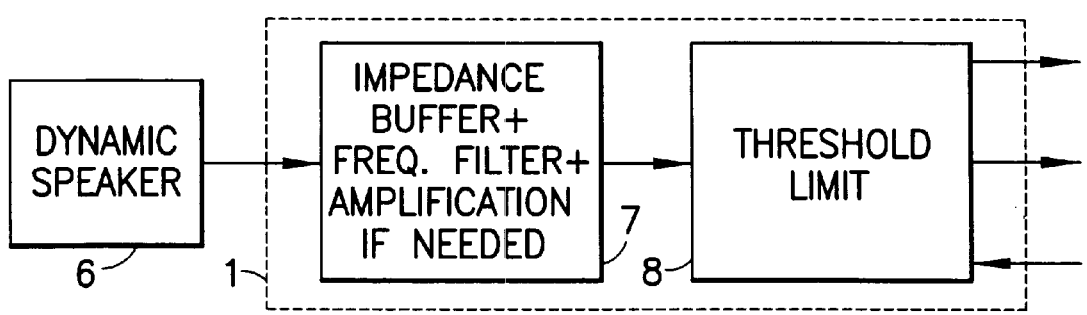
FIG. 2 is a block diagram of the sensor portion of this invention.

The components of the sensor circuit 1 are shown in FIG. 2 and include a dynamic speaker 6 connected to a amplifier/filter circuit 7 and a comparator circuit 8. The amplifier/filter circuit 7 provides buffer impedance for the low impedance signal from the speaker 6 and if necessary may also provide amplification. Comparator circuit 8 receives a reference voltage $V_{REF}$ from the microprocessor control unit 2 which is compared to the signal from speaker 6. In this manner, an output threshold is set to limit the shock signals to those greater than a minimum value, as it is only the extremes of shock forces that it is desired to record.

Figure 3:
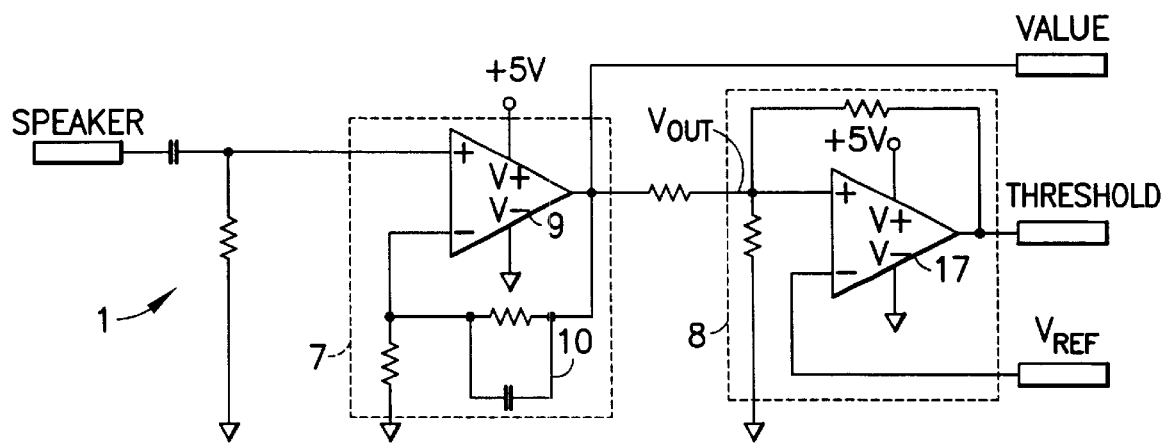
FIG. 3 is a circuit diagram of the sensor portion of this invention.

Although the signal from speaker 6 may be processed in a variety of ways to achieve the monitoring purpose of this invention, a specific sensor processing circuit 1 is shown in FIG. 3 for the purpose of illustration. In general because of the significant voltages generated by the speaker 6 when it receives a significant physical shock, amplification will not normally be required.

Figure 5:
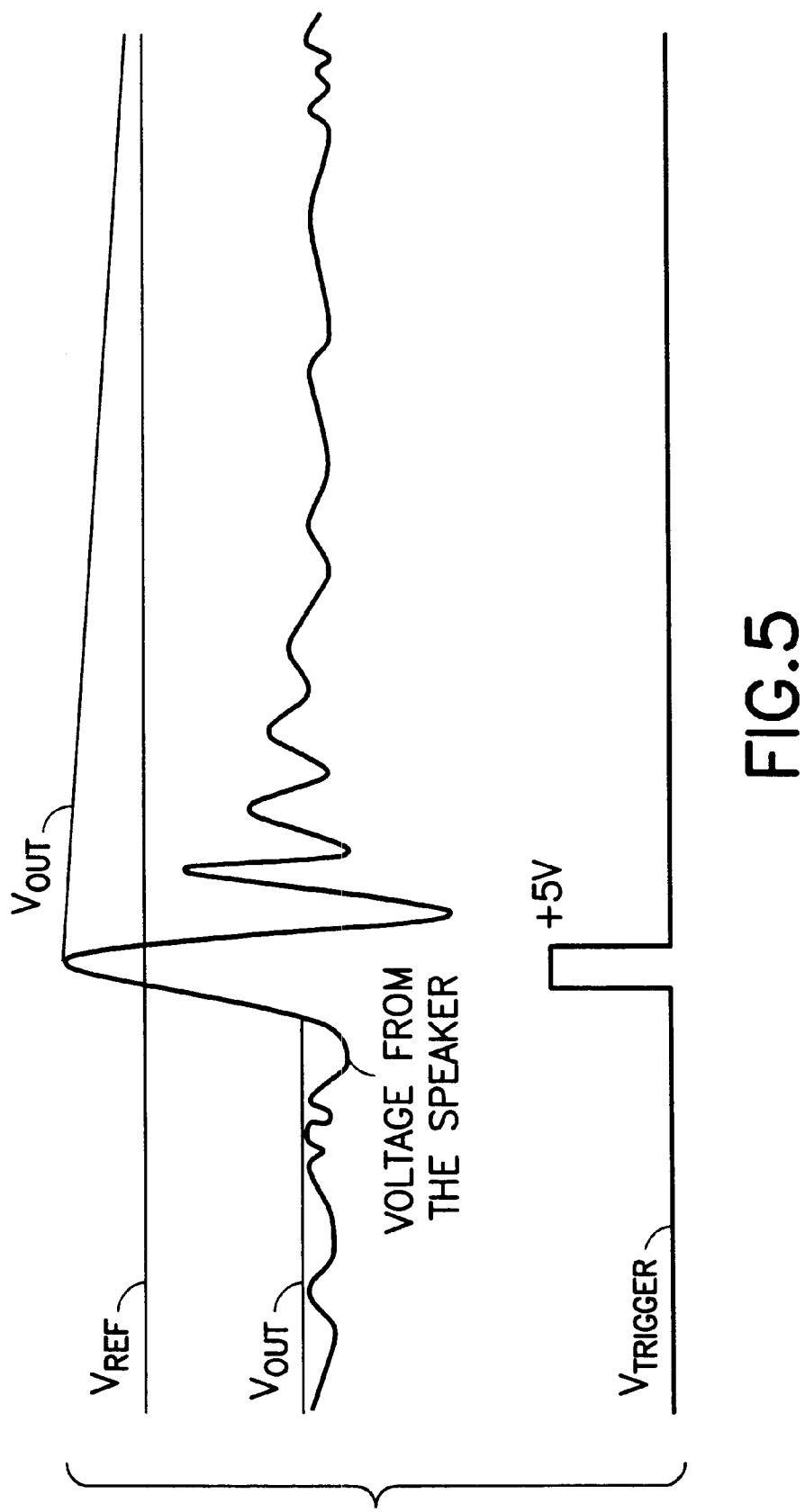
FIG. 5 is a graph showing the relationship $V_{REF}$, $V_{OUT}$, and $V_{TRIGGER}$.

In the sensor circuit 1 shown in FIG. 3, the signal from the speaker 6 is passed through an amplifier/filter circuit 7 which provides buffer impedance for the low impedance signal of speaker 6 and filters out environmental disturbances. Circuit 7 includes an amplifier 9 and a filter 10. A voltage reference $V_{REF}$ is set by microprocessor control unit 2, through a digital to analog converter 16 which facilitates alignment of the reference voltage during production. $V_{REF}$ is compared to the output signal $V_{OUT}$ of the amplifier/filter circuit 7 in comparator circuit 8, which includes an amplifier 17. Comparator circuit 8 is designed to generate a trigger pulse $V_{TRIGGER}$ when $V_{OUT}$ is greater than $V_{REF}$. This requires significant peaks of voltage which indicate extraordinary shocks received by the mobile phone. As shown in FIGS. 3 and 5, $V_{TRIGGER}$ will go to the positive supply voltage (+5 V) of amplifer 17 and will be detected as an interrupt by microprocessor control unit 2 to initiate the storing of the value of $V_{out}$.

Figure 4:
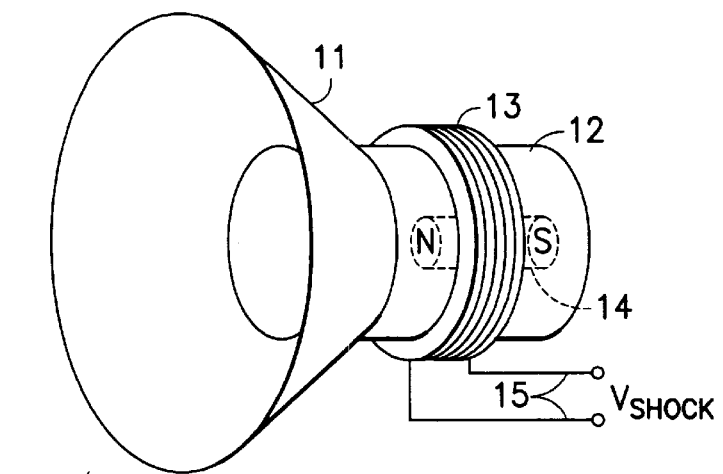
FIG. 4 is a schematic diagram of a speaker used as part of the subject invention.

A unique feature of this invention is the use of the dynamic speaker of the mobile phone as a transducer to sense when the mobile phone is subjected to significant shock. A schematic of a typical speaker is shown in FIG. 4. In this illustration, speaker 6 is comprised of a cone 11 connected to a moveable core or diaphragm 12 which is mounted for movement within a wire coil or winding 13. The diaphragm 12 contains a permanent magnet 14 which, in normal use, is caused to move within the winding 13 in response to voice signals from a receiver in the mobile phone. In this instance, however, the speaker 6 is also used as a transducer by reversing its operation. Violent movement of the mobile phone will jar the diaphragm 13 and cause the magnet 14 to move within winding 13. This will induce a voltage in the winding 13 which acts as a pickup coil of a typical transducer. The output voltage $V_{SHOCK}$ of the transducer/speaker 6 will appear at output terminals 15 and be proportional to the force to which the mobile phone is subjected. $V_{SHOCK}$ is processed by amplifier/filter 9 and comparator 10.

The shock signal is processed to eliminate spikes of voltage which may be caused by environmental disturbances or by minimal jarring during normal use. Peak signals are stored in the random access memory 4. When a mobile phone is submitted for warranty repair with, for example, the case damaged, but is otherwise servicable, the service technician may access the random access memory through an access port and, using a tool designed for this purpose download the shock signal record for analysis. Warranty service may be refused if the record indicates a misuse of the mobile phone.

In this manner a system for utilizing the transducer characteristics of a mobile phone ins constructed. This system may be used in other devices which employ dynamic speakers such as portable radios, cordless phones, beepers and the like.

I claim:

1. In apparatus containing a dynamic speaker, said speaker having a magnetized core and an input coil, a method of monitoring the shock to which the apparatus is subjected, comprising the steps of:
   providing an alternative connection to said speaker to provide an output for the voltage signal generated by movement of said magnetized core within said input coil when the apparatus is subject to shock,
   processing said signal to block the monitored signals which are below a predetermined minimum;
   converting said signal to a digital signal; and
   storing said signal in a microprocessor for future reference.

2. In apparatus containing a dynamic speaker, said speaker having a magnetized core and an input coil, a method of monitoring the shock to which the apparatus is subjected, as described in claim 1 further comprising the step of filtering said signal to isolate the shock signal from environmental disturbances.

3. In a mobile phone containing a dynamic speaker, said speaker having a magnetized core and an input coil, said mobile phone containing a microprocessor, a method of monitoring the shock to which the apparatus is subjected comprising the steps of:
   providing an alternative connection to said speaker to provide an output for the voltage signal generated by movement of said magnetized core within said input coil, when said mobile phone is subject to shock,
   processing said signal to block the monitored signals which are below a predetermined minimum;
   converting said signal to a digital signal; and
   storing said signal in said microprocessor for future reference.

4. In a mobile phone containing a dynamic speaker, said speaker having a magnetized core and an input coil, said mobile phone containing a microprocessor, a method of monitoring the shock to which the apparatus is subjected, as described in claim 3, further comprising the step of filtering said signal to isolate the shock signal from environmental disturbances.

5. In apparatus containing a dynamic speaker, said speaker having a magnetized core and an input coil, a device for monitoring the shock to which the apparatus is subjected comprising:
   an output connected to the speaker coil for obtaining the voltage signal generated by movement of said magnetized core within said input coil when the device is subject to shock,
   a processor connected to receive the filtered signal and to block the monitored signals which are below a predetermined minimum;
   a microprocessor connected to receive the processed signal, convert said signal to digital form and to store said signal in said microprocessor for future reference.

6. In apparatus containing a dynamic speaker, said speaker having a magnetized core and an input coil, a device for monitoring the shock to which the apparatus is subjected, as described in claim 5, further comprising a filter connected to receive said signal and to isolate said signal from environmental disturbances.

7. In a mobile phone which uses a dynamic speaker, said speaker having a magnetized core and an input coil, said mobile phone having microprocessor control, a device for monitoring the shock to which the apparatus is subjected comprising:
   an output connected to the speaker coil for obtaining the voltage signal generated by movement of said magnetized core within said input coil when the mobile phone is subject to shock;
   a processor connected to receive the filtered signal and to block those monitored signals that are below a predetermined minimum;
   said microprocessor control connected to receive the processed signal, convert said signal to digital form, and to store said signal in said microprocessor for future reference.

8. In a mobile phone which uses a dynamic speaker, said speaker having a magnetized core and an input coil, said mobile phone having microprocessor control, a device for monitoring the shock to which the apparatus is subjected, as described in claim 7, further comprising a filter connected to receive said signal and to isolate said signal from environmental disturbances.

* * * * *